May 6, 1924.

H. C. FOSTER

DIRIGIBLE SPOTLIGHT

Filed Jan. 26, 1923

1,492,682

INVENTOR.
HARRY C. FOSTER

BY

ATTORNEYS.

Patented May 6, 1924.

1,492,682

UNITED STATES PATENT OFFICE.

HARRY C. FOSTER, OF CONNERSVILLE, INDIANA, ASSIGNOR TO INDIANA LAMP COMPANY, OF CONNERSVILLE, INDIANA, A CORPORATION.

DIRIGIBLE SPOTLIGHT.

Application filed January 26, 1923. Serial No. 615,139.

*To all whom it may concern:*

Be it known that I, HARRY C. FOSTER, a citizen of the United States, and a resident of Connersville, county of Fayette, and State of Indiana, have invented certain new and useful Dirigible Spotlights; and I do hereby declare that the following is a full, clear, and exact description thereof, reference being had to the accompanying drawings, in which like numerals refer to like parts.

This invention relates to a dirigible spotlight applicable to either open or closed vehicles, and particularly that type of spotlight which extends through the body of the vehicle so that the light is on the outside and the operating handle on the inside thereof.

The particular object of the invention is to provide a universal ball and socket mounting and associated mechanism for adjustably supporting a spotlight and permitting its dirigible movement or adjustment through a minimum opening in the windshield, bracket or other supporting member.

One feature of the invention resides in the provision of a fixed supporting ball or sphere adapted to be rigidly clamped upon the body member or bracket through which there may extend a lamp-supporting spindle or tube movably mounted by two clamping members positioned on each side of the ball or sphere. The advantage of this construction lies in the fact that the spindle or tube, upon the end of which the lamp is mounted, may have the greatest latitude of movement through an aperture in the vehicle-supporting member of minimum diameter. In event the wind shield of the vehicle is the supporting member thereof, it is very desirable that the aperture made therein be of the smallest possible diameter since it is a difficult matter to bore a large hole through the glass, and the glass is weakened thereby. This construction permits of a relatively small aperture being used and still enables the lamp to be given an appreciably large latitude of adjustment.

Another feature of the invention resides in the clamping means for frictionally maintaining the lamp in adjusted position, both under spring tension and manually.

Other features of the invention will be hereinafter more specifically set forth and described pertaining more particularly to the rugged and durable construction.

Figure 1:
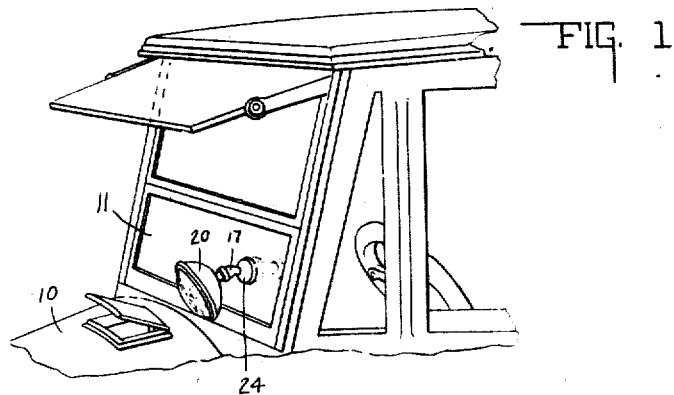
Figure 2:
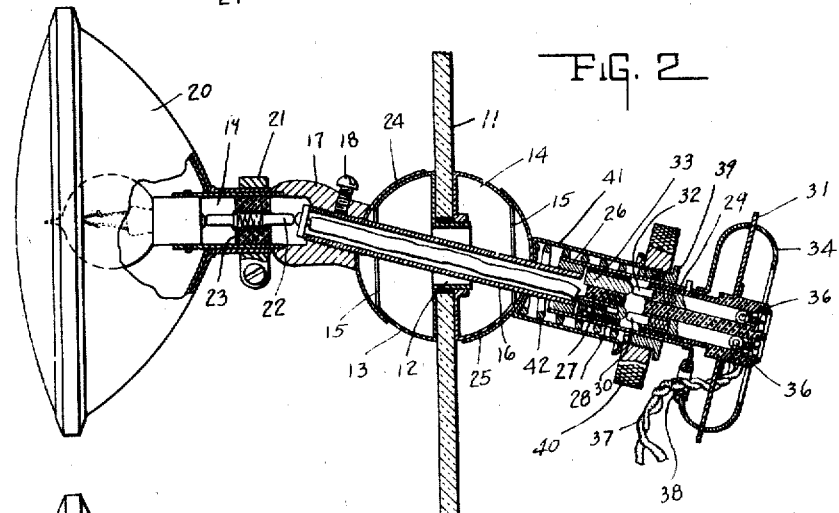
Figure 3:
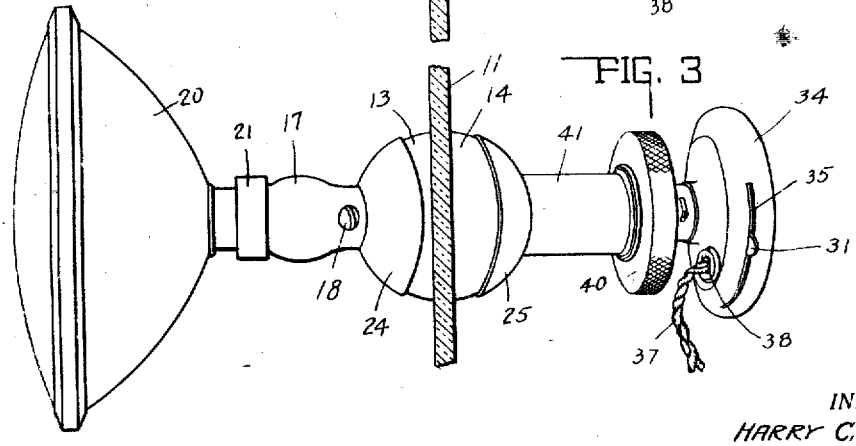

The full nature of the invention will be understood from the accompanying drawings and the following description and claims:

In the drawings, Figure 1 is a perspective view of the front or glass portion of a vehicle showing the spotlight mounted in the wind shield thereof. Fig. 2 is a central vertical cross section through the lamp support mounted on the wind shield. Fig. 3 is a plan view looking down on the lamp, showing the wind shield in cross section.

In the drawings there is shown a vehicle 10 having a wind shield glass 11 through which a lamp is adapted to be mounted. The wind shield is provided with a small annular opening cut therethrough so as to receive the neck 12 of a hemispherical supporting member 13. The neck 12 is externally screw threaded, whereby the oppositely mounted hemispherical supporting member 14 may be screwed. It will be observed that the members 13 and 14 may be screwed together on each side of the wind shield 11 so as to be rigidly secured thereon and clamp in fixed position. Said members 13 and 14 are so formed as to allow for the intermediate space taken up by the thickness of the wind shield, whereby when clamped in the position shown in Fig. 2, they will form a sphere, the center of which lies in the center of the hole through the wind shield.

Said members 13 and 14 have cut-away portions or openings 15 diametrically opposed and equidistant from the glass engaging surfaces thereof, through which there may extend a lamp-supporting spindle or tube 16. Said tube also extends through the neck 12. The end of the supporting tube 16 extending through the spheres to the outside or in front of the wind shield is screw threaded to receive a connecting elbow 17 which is located thereon by a screw 18. Said connecting elbow has mounted on the forward end thereof a lamp socket 19 and casing 20, said casing being clamped on said socket 19 by a band 21. Positioned in the socket 19 there is the usual yielding contact member 22 supported by the insulating plug 23. Positioned between the connecting elbow 17 and the hemispherical member 13 there is a concave clamping plate 24 having the same radius of curvature as the member 13 and having sufficient area to span the opening 15 in said member. Said plate is provided with an opening only sufficient to permit the tube 16 to extend therethrough.

Adjacent the surface of the hemispherical member 14 and spanning the opening 15 therein, there is a concave frictional plate 25 positioned in frictional engagement with the outer surface of said member 14 and of the same relative size and radius as the oppositely-mounted plate 24. Said plate 25 likewise has an opening of only sufficient diameter to permit the passage of the tube 16 therethrough, as shown in Fig. 2.

On the opposite end of the tube 16 from the casing 20 there is provided a socket 26 in which an insulating plug 27 is mounted through which a contact pin 28 extends. The opposite end of the socket 26 has rotatably mounted therein a switch socket 29 having a spring-pressed contact point 30 in position to engage and make contact with the point 28, when turned to lighting position and to brake the contact therewith when turned to off position by means of the operating levers 31 which are secured to said plug 29. The spring-pressed contact member 32 is carried by the plug 29 in position to make and break contact with the contact 33, which is grounded with the metal tube. Rigidly supported on the socket 26 there is an annular handle or grasping member 34 for actuating or adjusting the position of the lamp 20 through the pivotal movement of the tube 16. Said handle 34 is hollow and contains the switch member 31 which may be moved through the slot 35 therein and the terminals 36 to which an electric cable 37 may be attached, said cable extending through the insulated opening 38 therein.

Surrounding the socket 26 there is a collar 39, which is located rigidly thereon by a suitable screw and which is externally threaded. Mounted on said collar so as to screw back and forth thereon there is provided a tightening nut 40 which is knurled on its periphery so it may be gripped and screwed into tightening or loosening position. Between the nut 40 and the plate 25, there is a sleeve 41 which is provided at one end with a recessed portion adapted to fit snugly against the plate 25, the other end thereof being in engagement with the nut 40. Mounted within said sleeve and between the recess end and the collar 39, there is a tension spring 42, which exerts a constant pressure against said recessed end of the sleeve 41, forcing the same frictionally against the plate 25.

It will be observed that since the pressure of the spring 42 is exerted between the plate 25 and the collar 39, which is in direct connection through the tube 16 with the connecting member 17, it will exert a similar pressure on the friction plate 24. By reason of the tension in the spring 42, the friction plates 24 and 25 will be in frictional engagement with the surface of the hemispherical members 13 and 14 so that said plates will be frictionally held in adjusted position thereon, said position being changed by the annular movement of the handle 34 which will cause a like movement of the lamp casing 20. The tension of the spring 42 may be increased or decreased by the positioning of the collar 39 on the socket 26, and the sleeve 41 may be caused to force the plates 24 and 25 into rigid clamping position about the members 13 and 14 by manually gripping and tightening the nut 40 about said collar.

In operation, the light may be turned on and off by the movement of the switch lever 31 and the lamp may be adjusted so as to direct its rays in any desired direction within the limits of movement of the tube 16 by moving the handle 34. The spring 42 may be adjusted in tension so as to normally hold the lamp in adjusted position, and in the event it is desired to rigidly clamp the lamp in any given position, the nut 40 may be turned slightly by the fingers. After the casing 20 has been positioned, further adjustment thereof may be had by rotating the handle 34, which in turn will rotate the tube 16 and the connecting elbow 17. As will be observed in Fig. 2, the elbow 17 extends at a slight angle so that the rotation thereof will move the lamp 20 about a circle, the axis of which extends through the tube 16. This permits of a finer adjustment of the direction of the beam of light projected from the lamp after the more general positioning of the lamp has been had by the pivotal movement of the tube 16. It may be further noted that the lamp casing 20 will at all times remain in a plane through the tube 16 and handle 34, and will move about the axis therethrough.

While this invention has been shown and described as applied to the wind shield of a vehicle, it will be obvious that it may likewise be applied to the top or frame of the vehicle or any other portion of the body of the vehicle or may be supported upon a bracket for use in connection with an open vehicle, and various types of clamping plates or rings may be used in connection with the various types of supporting spherical members.

The invention claimed is:

1. A dirigible lamp comprising a rigidly-mounted ball support, clamping sockets movably supported thereby and engaging and clamping opposite sides of said ball, and a lamp-supporting member extending through said ball support and supported on said sockets for obtaining universal adjustment thereof with respect to said ball support.

2. A dirigible lamp comprising a rigidly-mounted ball support, clamping sockets movably supported thereby and engaging and clamping opposite sides of said ball, a lamp-supporting member extending through said ball support and supported on said sockets, and means on said lamp support for forcing said clamping sockets and ball support in frictional engagement for frictionally holding said lamp in adjusted position.

3. A dirigible lamp comprising a rigidly-mounted ball support, clamping sockets movably supported thereby and engaging and clamping opposite sides of said ball, a lamp-supporting member extending through said ball support and supported on said sockets, and a spring for yieldingly forcing said ball and clamping sockets into frictional engagement for holding said lamp in adjusted position.

4. A dirigible lamp comprising a rigidly-mounted ball support, clamping sockets movably supported thereby and engaging and clamping opposite sides of said ball, a lamp-supporting member extending through said ball support and supported on said sockets, and a manually operated member for forcibly clamping said ball and clamping sockets together for maintaining said lamp in fixed position.

5. A dirigible lamp comprising a rigidly-mounted ball support, clamping sockets movably supported thereby and engaging and clamping opposite sides of said ball, a lamp-supporting member extending through said ball support and supported on said sockets, a sleeve mounted on said lamp-supporting member in engagement with one of said sockets, and a spring contained in said sleeve for yieldingly exerting a force on said sleeve in one direction, and exerting an oppositely-directed force on the other socket for frictionally clamping said sockets against said supporting ball.

6. A dirigible lamp comprising a rigidly-mounted ball support, clamping sockets movably supported thereby and engaging and clamping opposite sides of said ball, a lamp-supporting member extending through said ball support and supported on said sockets, a sleeve mounted on said lamp-supporting member in engagement with one of said sockets, a spring contained in said sleeve for yieldingly exerting a force on said sleeve, and an oppositely-directed force on the other socket for frictionally clamping said sockets against said supporting ball, and means for manually exerting the force exerted by said spring.

7. The combination with a mounting for a spotlight having an opening therein, of a supporting ball formed in two sections adapted to be secured together on each side of said mounting and rigidly clamped thereon by means of a collar of reduced diameter extending through said opening, a longitudinally-extending lamp-supporting member adapted to extend through said ball and collar, and a pair of engaging sockets adapted to frictionally engage the opposite surfaces of said ball on each side of the mounting therefor for supporting said lamp-supporting member in adjusted position.

8. The combination with a mounting for a spotlight having an opening therein, of a supporting ball formed in two sections adapted to be secured together on each side of said mounting and rigidly clamped thereon by means of a collar of reduced diameter extending through said opening, a longitudinally-extending lamp-supporting member adapted to extend through said ball and collar, a pair of engaging sockets adapted to frictionally engage the opposite surfaces of said ball on each side of the mounting therefor for supporting said lamp-supporting member in adjusted position, and means on said lamp-supporting member for yieldingly maintaining said sockets in frictional engagement with said ball.

9. A mounting for adjustably supporting a lamp upon an apertured support, including a hollow stationary ball split into two sections and coaxially mounted with respect to said aperture so as to be fixedly clamped upon each side of said support, a pair of oppositely-disposed clamping members having an annular bearing surface of less diameter than said ball mounted in frictional engagement upon opposite sides thereof, and a lamp-supporting member extending through said hollow ball and the aperture in said support and mounted on said clamping members so as to be frictionally held in adjusted position with respect to said support.

10. A mounting for adjustably supporting a lamp upon an apertured support, including a hollow stationary ball split into two sections and coaxially mounted with respect to said aperture so as to be fixedly clamped upon each side of said support, a pair of oppositely-disposed clamping members having an annular bearing surface of less diameter than said ball mounted in frictional engagement upon opposite sides thereof, a lamp-supporting member extending through said hollow ball and the aperture in said support and mounted on said clamping members so as to be frictionally held in adjusted position with respect to said support, and yielding means for normally maintaining said clamping members in frictional engagement with the surface of said ball.

11. A lamp mounting for adjustably supporting a lamp upon an apertured support including a hollow stationary ball coaxially mounted with respect to said aperture, said ball being formed in two substantially hemispherical sections, one of said sections being provided with a threaded collar adapted to extend through said aperture upon which the other section may be screwed for clamping said sections against the opposite sides of said support, clamping members having an annular bearing surface of less diameter than said ball, and a longitudinally-extending lamp-supporting member adapted to extend through said ball and collar and be supported in adjusted position by said clamping members.

12. A lamp mounting for adjustably supporting a lamp upon an apertured support including a hollow stationary ball coaxially mounted with respect to said aperture, said ball being formed in two substantially hemispherical sections, one of said sections being provided with a threaded collar adapted to extend through said aperture upon which the other section may be screwed for clamping said sections against the opposite sides of said support, clamping members having an annular bearing surface of less diameter than said ball, a longitudinally-extending lamp-supporting member adapted to extend through said ball and collar and be supported in adjusted position by said clamping members, and a lamp casing eccentrically mounted on one end of said lamp-supporting member.

In witness whereof, I have hereunto affixed my signature.

HARRY C. FOSTER.